US008323756B2

(12) United States Patent
Peterson

(10) Patent No.: US 8,323,756 B2
(45) Date of Patent: Dec. 4, 2012

(54) METHODS FOR DISPLAYING A BIRD'S TAIL FAN

(75) Inventor: Darrell E. Peterson, Arena, WI (US)

(73) Assignee: Skip Enterprises, LLC, Arena, WI (US)

( * ) Notice: Subject to any disclaimer, the term of this patent is extended or adjusted under 35 U.S.C. 154(b) by 0 days.

(21) Appl. No.: 13/432,025

(22) Filed: Mar. 28, 2012

(65) Prior Publication Data

US 2012/0180297 A1 Jul. 19, 2012

Related U.S. Application Data

(62) Division of application No. 11/682,953, filed on Mar. 7, 2007, now Pat. No. 8,168,305.

(60) Provisional application No. 60/745,566, filed on Apr. 25, 2006.

(51) Int. Cl.

| | |
|---|---|
| ***G09B 23/00*** | (2006.01) |
| ***A47G 35/00*** | (2006.01) |
| ***A01N 1/00*** | (2006.01) |
| ***A01M 31/06*** | (2006.01) |

(52) U.S. Cl. .................... 428/16; 428/542.4; 428/913.3; 43/2; 43/3; 434/296

(58) Field of Classification Search .................. 434/296; 43/2, 42.25; 269/71; 211/70.6, 68, 70.2, 211/70.8; 248/284.1, 316.5

See application file for complete search history.

(56) References Cited

U.S. PATENT DOCUMENTS

| | | | | |
|---|---|---|---|---|
| D24,903 | S | 11/1895 | Elmore | |
| 1,438,659 | A | 12/1922 | Nailor | |
| 2,443,430 | A * | 6/1948 | Nigro | 264/243 |
| 4,590,699 | A | 5/1986 | Nicks | |
| D300,283 | S | 3/1989 | Duckro, Jr. et al. | |
| 5,064,725 | A | 11/1991 | Acker | |
| D331,319 | S | 12/1992 | Stinson | |
| 5,437,935 | A * | 8/1995 | Fredeen | 428/542.4 |
| D398,697 | S | 9/1998 | Scordo | |
| 5,983,552 | A | 11/1999 | Nelson | |
| 6,451,393 | B1 | 9/2002 | Ploetz | |
| 6,487,810 | B1 | 12/2002 | Loughman | |
| D469,600 | S | 2/2003 | Scalise | |

(Continued)

OTHER PUBLICATIONS

Fan Danger. http://www.deadeyesupply.com/Fan_Dangler.html May 2009.*

*Primary Examiner* — Jennifer Chriss
*Assistant Examiner* — Ricardo E Lopez
(74) *Attorney, Agent, or Firm* — K&L Gates LLP

(57) ABSTRACT

A display device for spreading a turkey's tail feathers in a fan-like display is provided. The device consists of an elongated shank having two opposing ends, and two quill clips located one at each of the two opposing ends of said shank having grooves that snap onto the quills near the base of two or more of the turkey's outer tail feathers located to either opposite side of the hub. When installed, the device is invisible to view. An adjustable joint may be provided to enable adjusting a version of the shank having two arms to a certain angle to optimize the turkey fan display. A mounting mechanism may further be provided for mounting an object to the turkey fan display such as the beard, or a pole for use of the fan as a decoy in the field.

16 Claims, 9 Drawing Sheets

U.S. PATENT DOCUMENTS

| | | | |
|---|---|---|---|
| 6,560,894 | B2 | 5/2003 | Leber |
| 6,775,943 | B2 | 8/2004 | Loughman |
| 8,168,305 | B1 | 5/2012 | Peterson |
| 2003/0082316 | A1 | 5/2003 | Scott |
| 2003/0140913 | A1 | 7/2003 | Stinson |
| 2004/0250461 | A1 | 12/2004 | Dryer |
| 2005/0081422 | A1 | 4/2005 | Bradford |

* cited by examiner

METHODS FOR DISPLAYING A BIRD'S TAIL FAN

CROSS-REFERENCES

The present non-provisional patent application is a division of co-pending U.S. patent application Ser. No. 11/682,953 filed on Mar. 7, 2007 which claims the benefit of U.S. Provisional Patent Application Ser. No. 60/745,566, filed Apr. 25, 2006, both of which are incorporated herein by reference in their entireties.

STATEMENT REGARDING FEDERALLY SPONSORED RESEARCH OR DEVELOPMENT

Not applicable.

BACKGROUND

It has long been a tradition among hunters to pose for photographs of their prey and to mount the prey for later viewing. When the prey is turkey, hunters posing for a trophy shot with the bird attempt to spread its tail feathers in order to properly display them for the photo. This requires that the hunter use one or both hands to spread the tail feathers and to hold them in place during the photo. Attempts to simultaneously hold the hunter's weapon are difficult, clumsy and may cause an accident if the weapon accidentally falls.

Likewise, though devices exist to arrange a turkey's tail feathers for display on a wall or in the field as a decoy [see, e.g., U.S. Pat. No. 5,064,725 to Acker; U.S. Pat. No. 5,437,935 to Fredeen; U.S. Pat. No. 6,487,810B1 and U.S. Pat. No. 6,775,943B2 to Loughman; U.S. Pat. No. 6,451,393B1 to Ploetz; U.S. Pat. No. 6,560,894B2 to Leber; US 2003/0082316A1 by Scott; US 2004/0250461A1 by Dryer; and US2005/0081422A1 by Bradford], none do so without (a) requiring that tail feathers be individually inserted or attached to a portion of the display; (b) sandwiching tail feathers between plates, thereby obscuring the view of the complete tail fan; and/or (c) preventing display of the full cape and/or beard of the turkey in addition to the tail fan itself. None provide as mechanism for the display of the turkey's feathers free from the distracting view of portions of the display device itself.

Presently, no devices exist to spread the tail fan feathers of a freshly killed turkey in the field, without also requiring the hunter to use one or both hands in the process.

SUMMARY

The present invention is directed to solving the above problems by providing a simple hands-free display device for spreading the tail feathers of a recently harvested turkey, thereby freeing the hunter to safely pose for a trophy shot near the bird with his weapon without having to simultaneously use one or both hands to spread the bird's tail feathers. Likewise, the present invention solves the problem of displaying the bird's feathers only (including, tail fan and optionally also cape and beard), by providing a device that attaches to the back of the tail fan, spreading the tail feathers while remaining invisible to the viewer from the front. This latter function is beneficial both for the hunter's home use and for use by a taxidermist.

The display device of the present invention functions to spread a turkey's tail feathers in a fan-like display about a central hub from which the tail feathers extend, each of the tail feathers having a central quill attaching a base of the feather to the hub.

in one version, the display device consists of an elongated shank having two opposing ends defining a length there between and, two quill clips. The quill clips are located one at each of the two opposing ends of the shank and snap onto the quills near the base of one or more of the turkey's outer tail feathers located to either opposite side of the hub. In this way the clipped outer tail feathers are held the length of the shank apart and the turkey's tail feathers located intermediate the clipped outer tail feathers are spread apart in the fan-like display about the hub.

In another version, the display further consists of a mounting mechanism attached to the shank at a location midway between its two opposing ends. The mounting mechanism serves to mount an object to the display device. For example, a pole may be mounted on the display for using the turkey tail, fan as a decoy in the field, or, the beard of the bird may be mounted to become a part of the display.

in still another version, the shank is divided into two arm members by an adjustable joint located midway between the shank's two opposing ends. Each arm member extends out from the joint to one of the two opposing ends at an angle defined by adjustment of the joint. This version enables a user to adjust the angle to which the tail feathers are spread when displaying the tail fan. It further enables the device to be folded when not in use, making it smaller and more easily transported.

BRIEF DESCRIPTION OF THE DRAWINGS

For a better understanding of the present invention, reference may be made to the accompanying drawings, in which.

DESCRIPTION

Figure 1A:
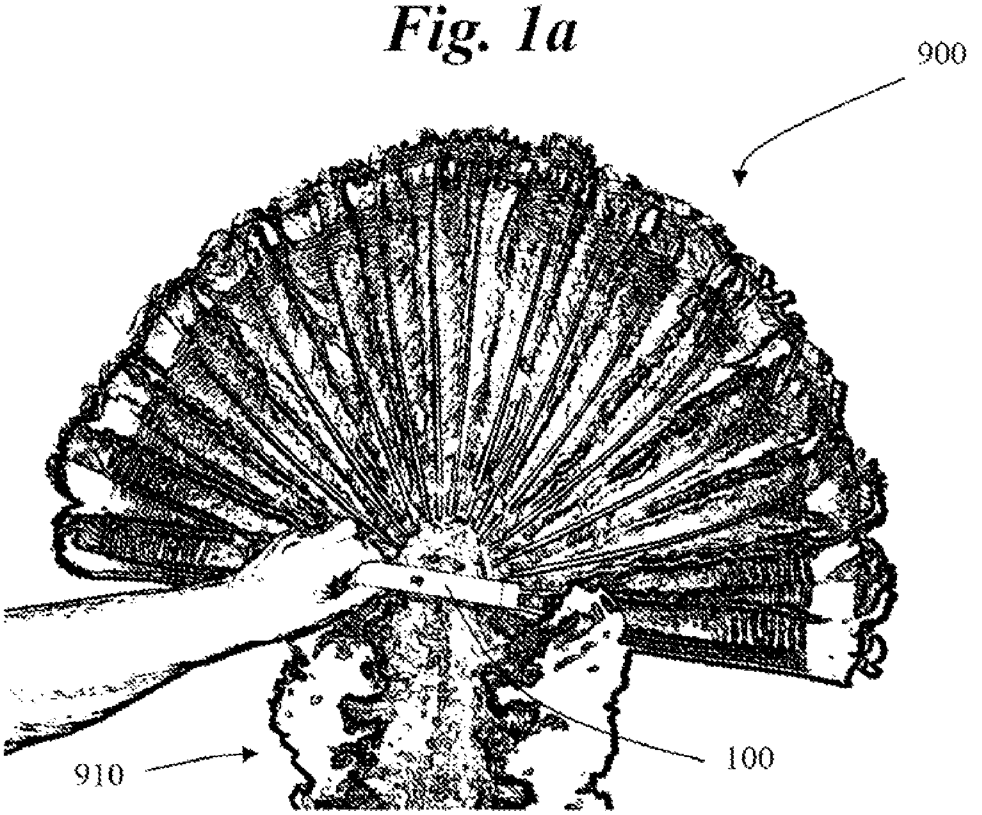
FIG. 1*a*, shows a user holding one version of the display device of the present invention which is locked in place on quills of tail feathers to either side of the hub on the back side of the turkey's fan tail (also shown is a portion of the back of the cape feathers)

Referring now specifically to the figures, in which identical or similar parts are designated by the same reference numerals throughout, a detailed description of the present invention is given. It should be understood that the following detailed description relates to the best presently known embodiment of the invention. However, the present invention can assume numerous other embodiments, as will become apparent to those skilled in the art, without departing from the appended claims. For example, the present invention may be used to display and or mount tail fans of other types of birds in addition to turkeys.

It should also be understood that, while the methods disclosed herein may be described and shown with reference to particular steps performed in a particular order, these steps may be combined, sub-divided, or re-ordered to form an equivalent method without departing from the teachings of the present invention. Accordingly, unless specifically indicated herein, the order and grouping of the steps is not a limitation of the present invention.

As mentioned above, the present invention is directed to providing a simple hands-free mechanism for spreading, the tail feathers of a recently harvested turkey, freeing a hunter to pose safely for a trophy in the field, without having to use one or both hands to spread the bird's tail feathers while simultaneously posing with his weapon. Likewise, the present invention is directed to providing a mechanism for displaying the bird's feathers (including the tail fan and optionally also the cape and heard) while remaining invisible to the viewer. This latter function is beneficial both for the hunter's home use and for use by a taxidermist.

Figure 6A:
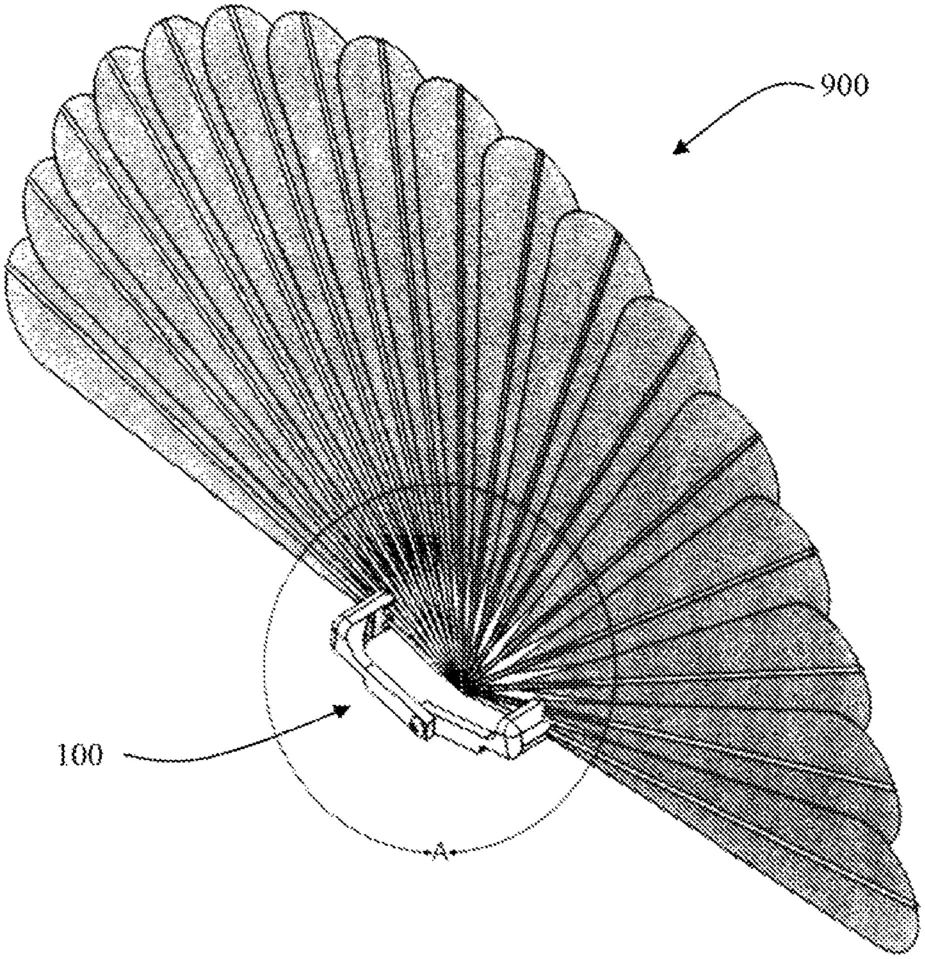
FIG. 6*a*, shows a jointed version of the display device of the present invention locked in place on quills to either side of the hub on the back side of a turkey tail fan.
Figure 6B:
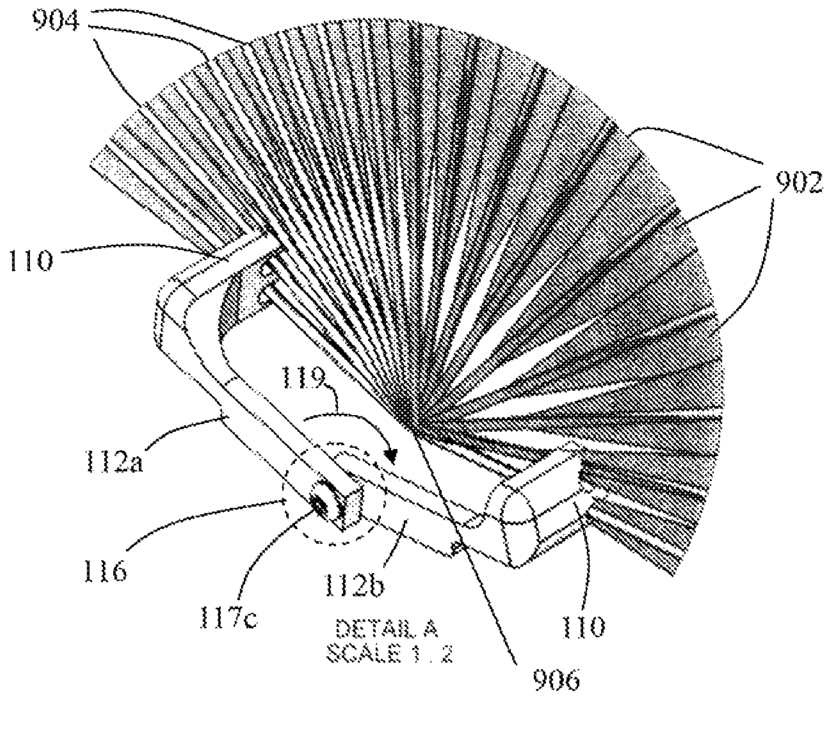
FIG. 6*b*, shows the detail section "A" depicted in FIG. 6*a*, illustrating how the clips of the display device clip onto feather quills on opposing, sides of the hub of the tail fan; and, FIG. 7, shows a back side view of a turkey tail fan and attached display device.
Figure 7:
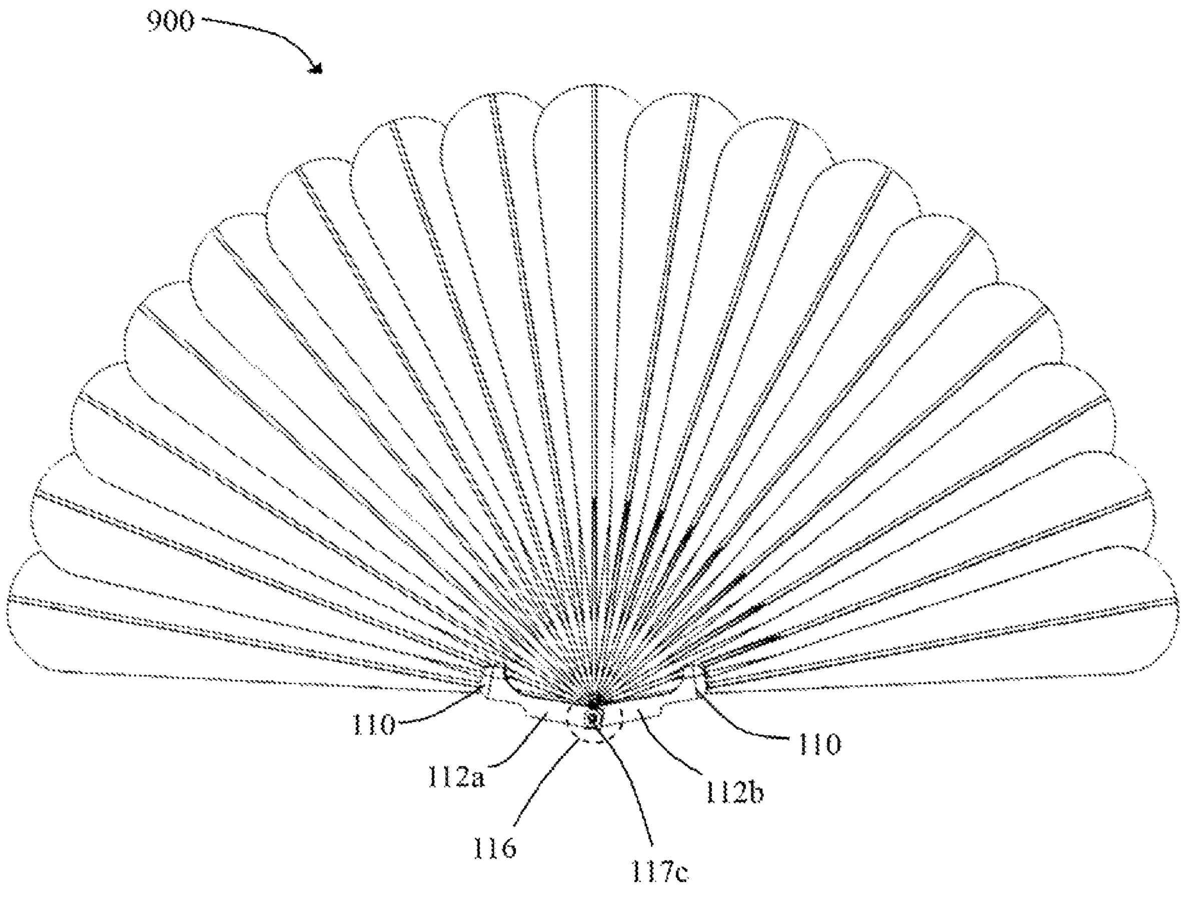

By way of background, each of a turkey's tail feathers 902 consists of a central quill 904 running its length (see FIG. 6*b*). The quills 904 of the tail feathers are embedded in a huh 906 at the base of the feathers. The tail feathers 902 extend outward from the hub 906 and form a fan-like display 900 (or, fan, see also FIG. 6*a*) when outer tail feathers located at opposite sides of the hub are pulled in opposite directions, thus spreading apart the intervening tail feathers (i.e., those tail feathers located intermediate the opposing outer tail feathers).

Referring to FIG. 1*a*, the present invention is a display device 100 (or, spreader) used to spread turkey tail feathers into a fan 900 in order that they be properly displayed for trophy shot's at the site of a kill, or for later display of the tail fan 900 (and optionally also cape 910 and beard 920 feathers) when mounted on a wall or when used as a decoy in the field. Shown in FIG. 1*a* is a version of the device 100, attached to the hack side of a turkey tail fan 900 with an attached cape 910 extending downward from the fan. A user is shown holding the display device 100 for purposes of illustration.

Figure 1B:
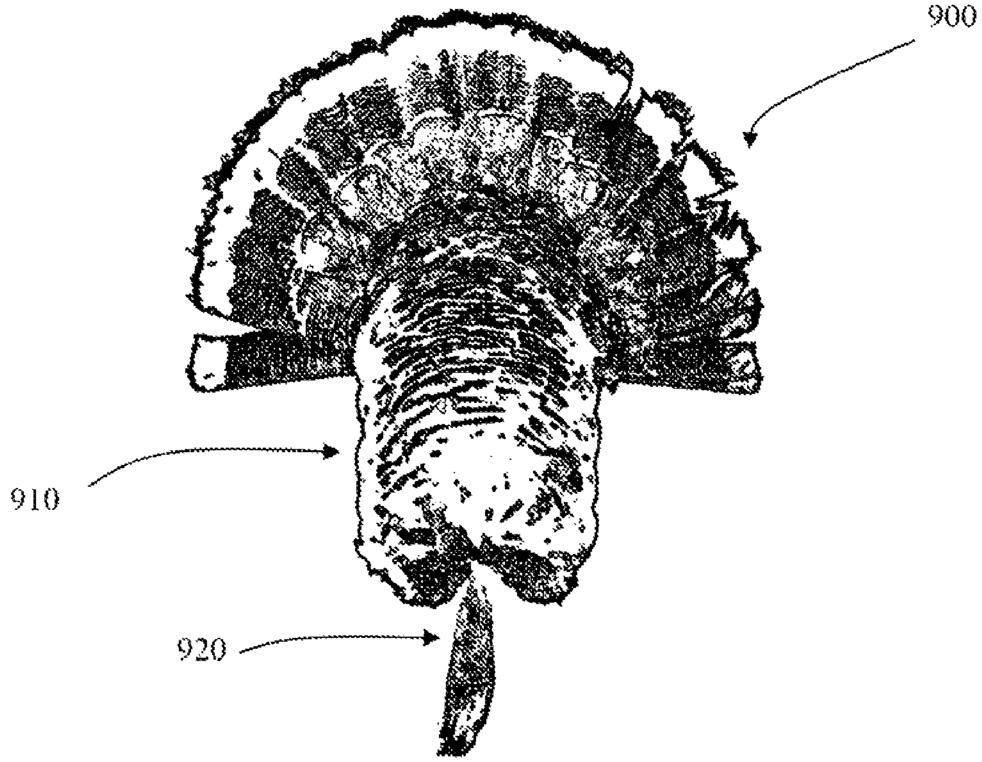
FIG. 1*b*, shows a front view of the turkey's feather display as shown from behind in FIG. 1*a*, showing the tail fan, cape and beard hilly displayed with the display device of the present invention in place and out of sight behind the displayed feathers.

Referring: to FIG. 1*b*, a front view is provided of the turkey fan 900, cape 910 and beard 920 feathers held by the display device 100 as shown in FIG. 1*a*. In this view the present invention is being used to spread the tail fan 900 of a turkey for wall-mounting purposes and illustrates the present invention's advantage over mechanisms currently available in that the present invention allows display of (a) only the bird's feathers while the display remains invisible to a viewer (i.e., the other mechanisms often have from plates visible to viewers); and (b) additional portions of the feathers including not only the tail fan 900 but also the full cape 910 and beard 920.

Figure 2A:
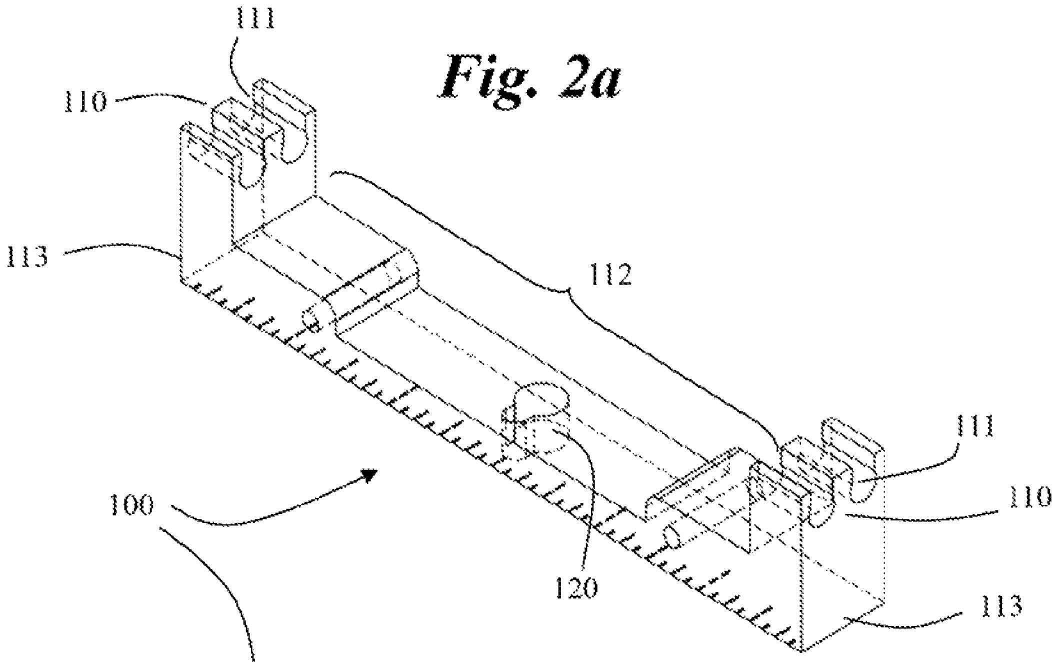
FIG. 2*a*, shows a mechanical drawing of a front perspective view from the top of one version of the display device of the present invention.
Figure 2B:
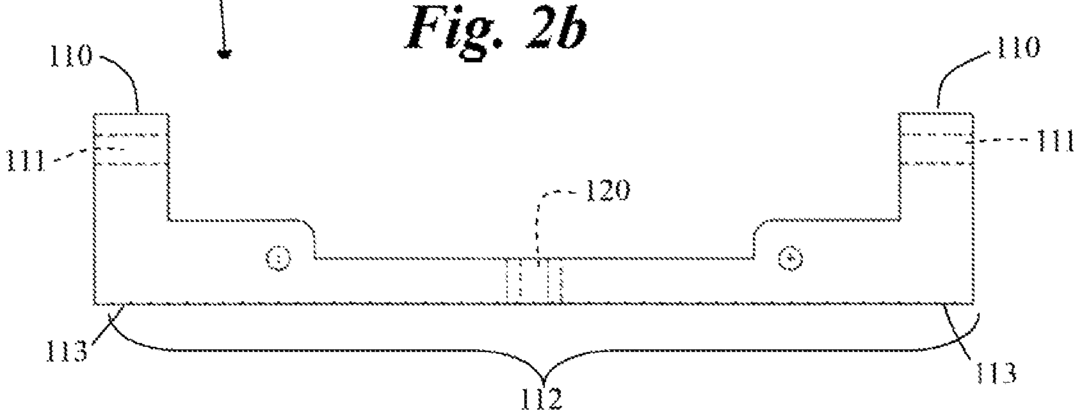
FIG. 2*b*, shows a top side view of the display device of FIG. 2*a* (the bottom side view is the same)
Figure 2C:
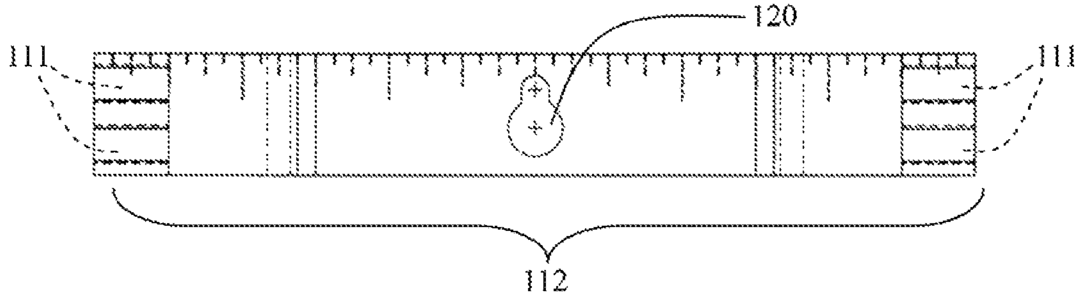
FIG. 2*c*, shows a back side view of the display device of FIG. 2*a* with optional scale markings shown along one edge of the shank.
Figure 2D:
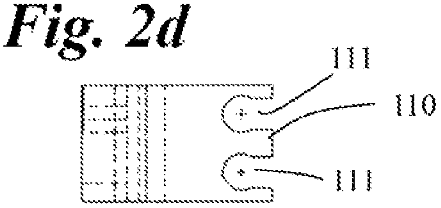
FIG. 2*d*, shows a right side view of the display device of FIG. 2*a;*
Figure 3A:
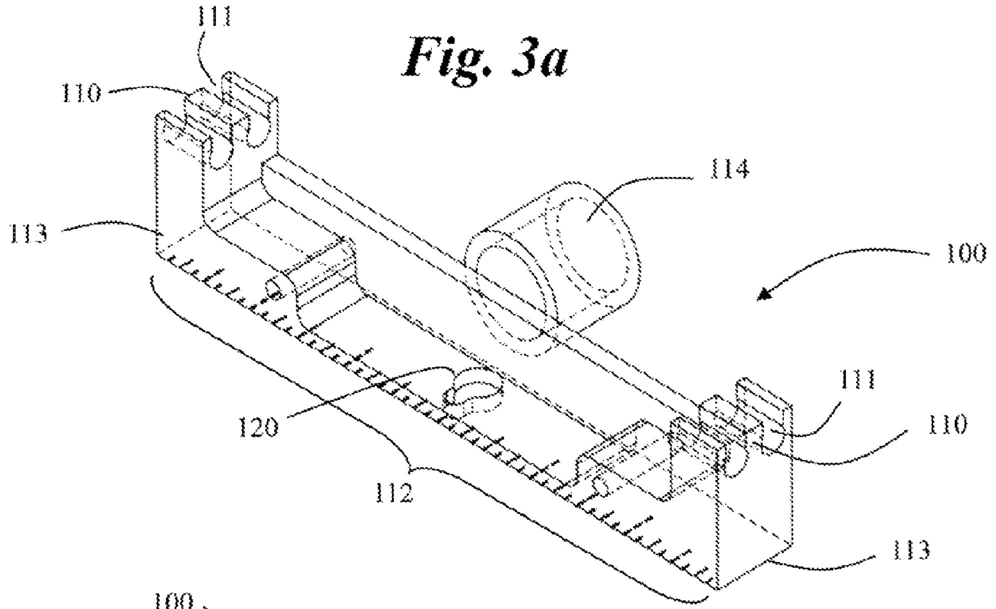
FIG. 3*a*, shows a mechanical drawing of a front perspective view from the top of one version of the display device of the present invention including a mounting mechanism 114.
Figure 3B:
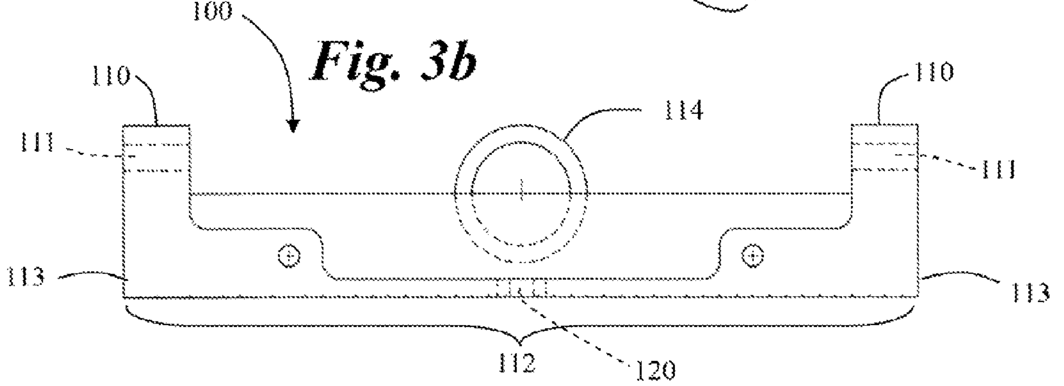
FIG. 3*b*, shows a top side view of the display device of FIG. 3*a;*
Figure 3C:
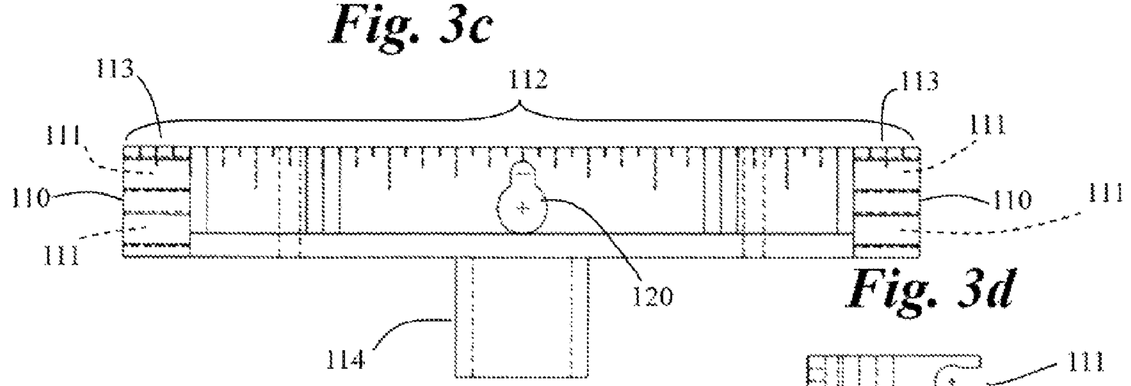
FIG. 3*c*, shows a back side view of the display device of FIG. 3*a* with optional scale markings shown along one edge of the shank.
Figure 3D:
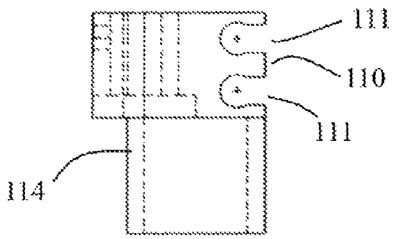
FIG. 3*d*, shows a right side view of the display device of FIG. 3*a;*

Referring to FIGS. 2*a* to 2*d*, mechanical drawings of several views of one version of the display device 100 are shown (i.e., front perspective view from the top in FIG. 2*a*; top side view (bottom side view is the same) in FIG. 2*b*; back side view showing optional hanging mechanism 120 (also shown in FIG. 2*a*) and optional scale markings along one edge of the shank 112 in FIG. 2*c*; and, a right side view in FIG. 2*d*).

The display device 100 generally consists of an elongated shank portion 112 having two opposing ends 113 defining a length there between, and two quill locking mechanisms 110 (or quill clips), one located at each of the two opposing ends of the shank 112. The display 100 may be made out of any type of rigid material that will hold its shape and withstand pressure from the fan to close, such as metal, wood, hard plastics, etc. It may be made by machining of these materials, by injection molding in the case of plastics, or by other means. Tension springs may be employed in versions of the display device 100 haying adjustable joints (see below).

The locking mechanisms are clips 110 having one or more grooves 111 sized and shaped to fit snugly when snapped into place on a quill. In use, the clips 110 are inserted on quills near the base of one or more of the outer tail feathers located on opposite sides of the hubs (see FIGS. 1*a, b*, 4*a*, 6*a*-6*h*, 7). By so doing, the clips hold the outer feathers apart the length of the shank 112, thereby spreading the feathers located intermediate the outer feathers into the fanlike display 900.

As illustrated in FIGS. 2*a* and 2*d*, the quill clips 110 each have two grooves 111 into which a quill may be snapped, two quills per clip 110 in this example. The clips 110 may each accommodate other numbers of quills, however, including one, or more than two, depending on the number of grooves provided in each clip. Also, a user may opt to clip fewer quills than allowed given the number of grooves 111. For example, a user of the 2-groove version illustrated in the figures might opt to clip only one quill 904 in each quill clip 110. Clipping only one quill 904 to either side of the hub 906 is sufficient to spread the tail fan 900.

The quills of a turkey's tail feathers are hollow and will tend to compress about 0.020 inches (0.05 cm) when squeezed. The quill clips 110 take advantage of this by snapping into place on the quill 904, thus locking onto the quills for a strong and secure hold (both on freshly killed birds and on feather fans that have dried out). The grooves 111 are substantially cylindrical having, circular bases sized to fit the quills snugly when a quill is snapped into place and slightly narrower openings to hold the quill in place once inserted (see FIGS. 2*d*, 3*d*, 5*e* and 5*i*). For use in snapping onto turkey feathers, the diameter of the circular base of the clip grooves is ideally about 0.25 inches (0.64 cm). When the display device 100 is designed for use with other varieties of birds such as grouse or pheasant (or with other varieties of turkeys having differently sized quills), the clip grooves 111 will be sized accordingly to fit snugly to their quills. Likewise, the overall sizing of the device 100, including its shank 112 (or shank anus 112*a*/112*b*, see FIGS. 5*a* to 5*i*), may also vary in accordance to the size of the particular bird variety's tail fan dimensions.

This snapping onto the quills of outer tail feathers located on opposite sides of the hub, combined with the resistance from the tail fan which tends to return to its normal relaxed (i.e., non-fanned) position, enables the display device 100 to create a strong hold to keep the tail feathers spread. This has the advantage of providing a display of the feathers unobstructed by the display device itself, which is located entirely behind the feather display and out of sight of a viewer. It also provides the advantage of being easily and rapidly attached to a bird in the field, providing hands-free display of the tail tan 900 convenient for photography of the turkey and hunter.

Figure 4A:
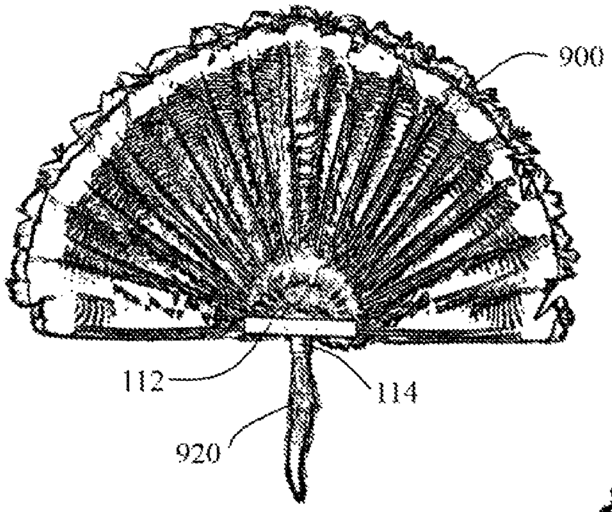
FIG. 4*a*, shows a version of the display device including a mounting mechanism 114, the device being attached to the back side of a turkey tail fan and including a beard inserted into the mounting mechanism.
Figure 4B:
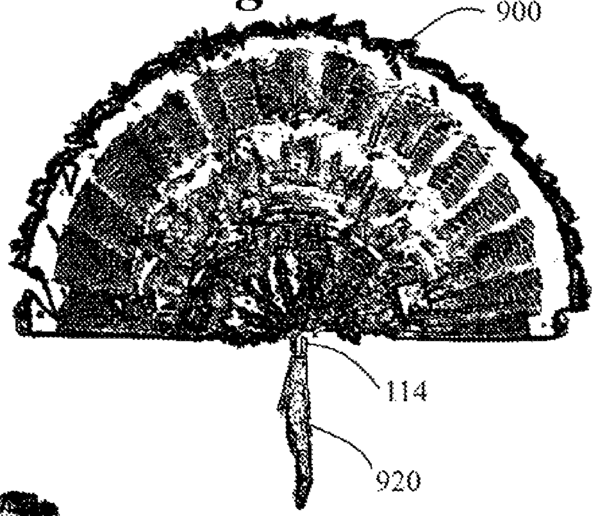
FIG. 4*b*, shows a front view of the display device plus turkey tail fan and beard of FIG. 4*a;*
Figure 4C:
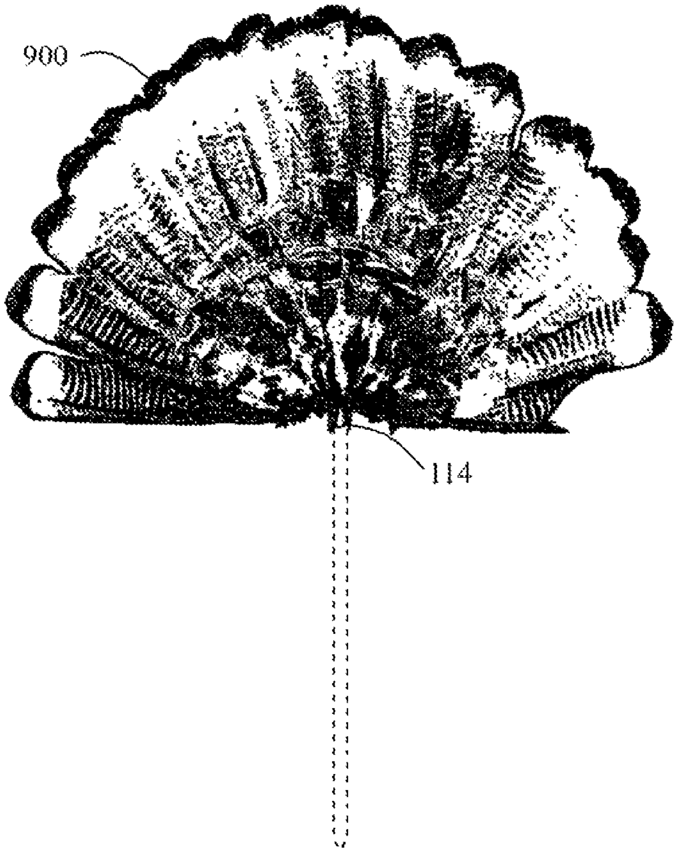
FIG. 4*c*, depicts a front view of a display device with mounting mechanism such as that shown in FIG. 4*b*, but with a pole inserted into the mounting mechanism instead of a beard.
Figure 5A:
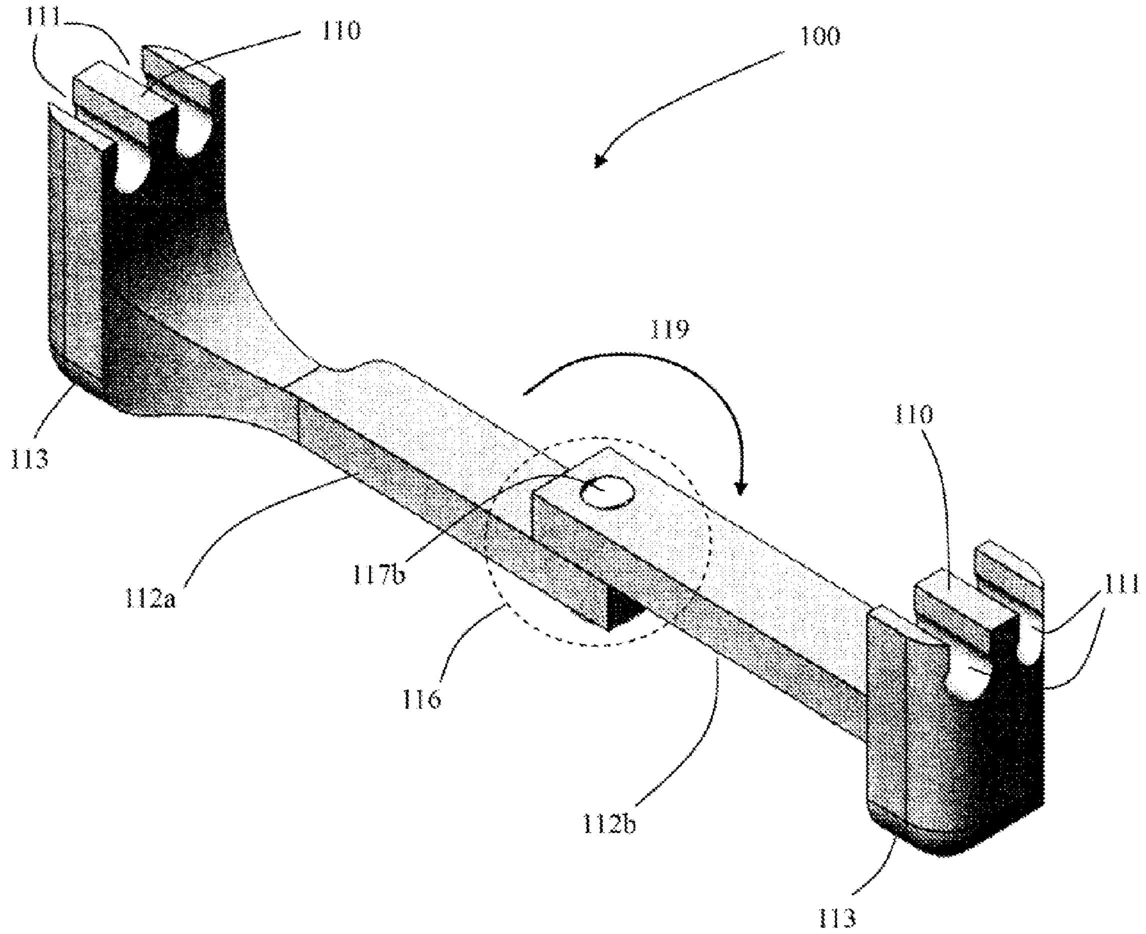
FIG. 5*a*, shows a front perspective view from the top of one version of the present invention including a jointed shank.
Figure 5B:
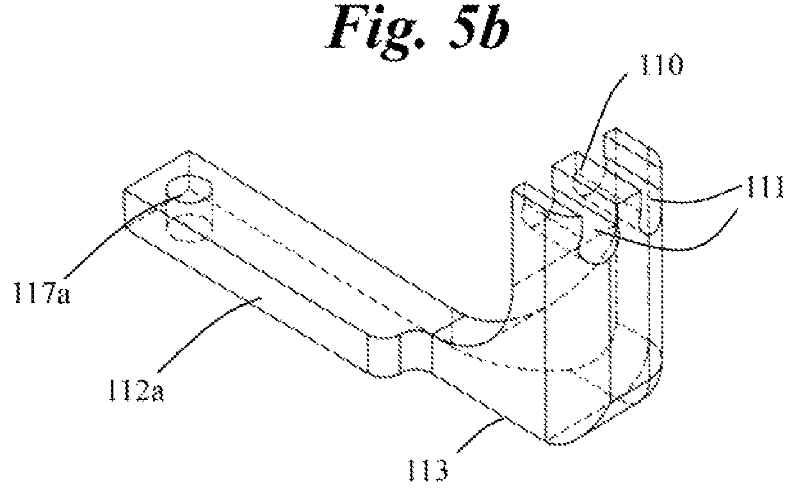
FIGS. 5*b* to 5*e*, show various scale isometric drawings of the shank arm 112*a* of FIG. 5*a* including, a front perspective view from the bottom (FIG. 5*b*); a bottom side view (FIG. 5*c*); a back side view (FIG. 5*d*); and, a side view of the clip end (FIG. 5*e*)
Figure 5C:
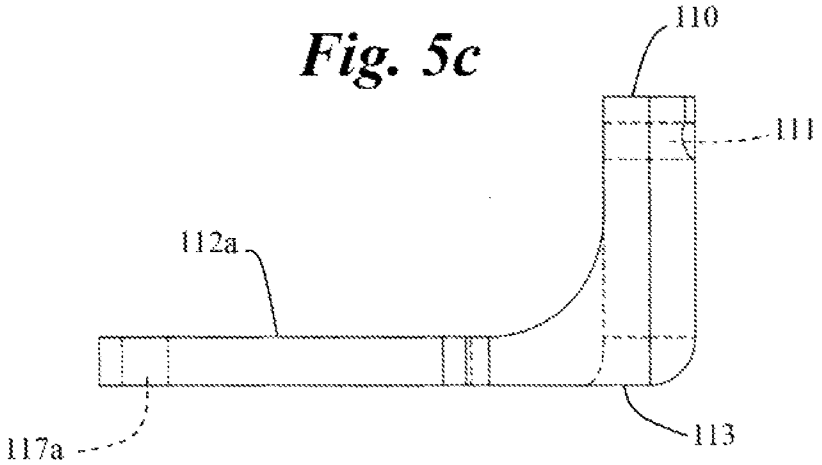
Figure 5D:
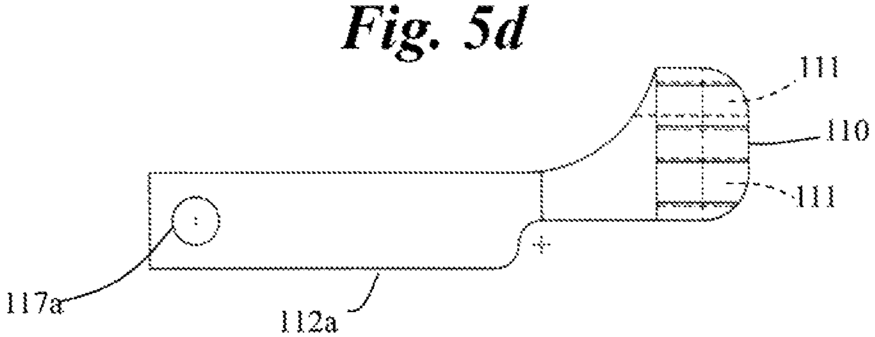
Figure 5E:
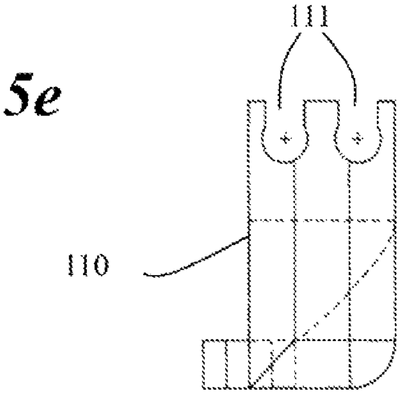
Figure 5F:
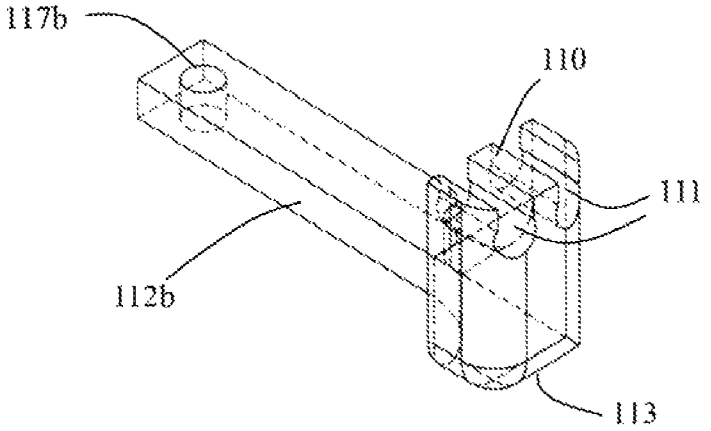
FIGS. 5*f* to 5*i*, show various scale isometric drawings of the shank arm 112*h* of FIG. 5*a* including, a front perspective view from the top (FIG. 5*f*); a top side view FIG. 5*g*); a front side view (FIG. 5*h*); and a side view of the dip end (FIG. 5*i*)
Figure 5G:
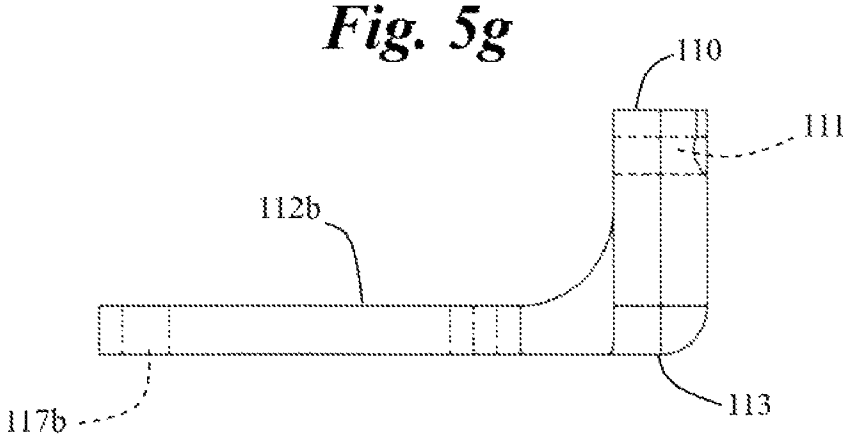
Figure 5H:
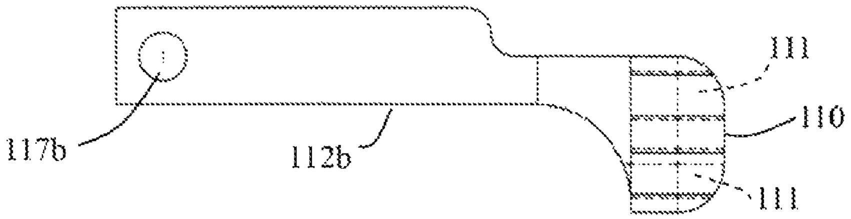
Figure 5I:
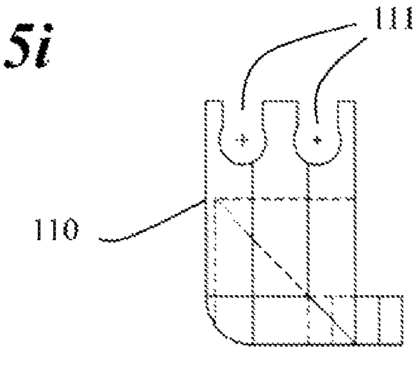

This version of the display device 100 may further consist of a mounting mechanism 114 for mounting an object to the display. For example, a pole may be mounted to the display 100 when using the tail fan 900 as a decoy in the field (e.g., as in FIG. 4*c*). Another use is for mounting the turkey's beard 920 during display as in FIGS. 4*a*-4*b*, showing views from behind and in front of the display, respectively). When viewed from the front, the only portions of this version of the display device 100 remaining visible, is the mounting mechanism 114 (see FIGS. 4*b*, 4*c*). When colored to match the feathers (e.g., brown for turkeys), its impact on the overall display is minimized.

The mounting mechanism 114 is attached to the shank 112 of the display device 100 at a location midway between its two opposing ends. Referring to FIGS. 3*a* to 3*d*, mechanical drawings of several views of this version of the display device 100 are shown (i.e., front perspective view from the top in FIG. 3*a*; top side view in FIG. 3*b*; back side view showing optional scale markings along one edge of the shank in FIG. 3*c*; and, a right side view in FIG. 3*d*). As depicted in these figures, the mounting mechanism 114 is a simple cylindrical collar sized to fit a pole or other similar object for display in the field as a decoy (see FIG. 4*c*), or for insertion of the beard 920 of the bird (see FIGS. 4*a*-4*b*). The mounting mechanism 114, however, may take on other forms to fit other types of objects. For example, the mount 114 may be shaped to fit non-cylindrical poles when used in the field as a decoy. Likewise, the mount 114 may be a type of clip fashioned to hold objects meant to be used with the fan display 900 such as decorations, plaques, and the like, in addition to its function in attaching the fan display 900 to poles, branches and other supports when used as a decoy in the field.

In another version of the display device 100 of the present invention, the shank 112 consists of an adjustable joint 116 located mid-way between the shank's two opposing ends and dividing the shank into two arm members 112*a*/112*b*. Referring to FIGS. 5*a*-5*i*, drawings of several views of this version of the display device 100 are shown [i.e., a front perspective view from the top of an assembled device showing both arms 112*a* and 112*b* in FIG. 5*a*; then, isometric drawings of each arm (112*a* in FIGS. 5*b* to 5*e*, 112*b* in FIGS. 5*f* to 5*i*)].

The joint 116 functions to connect the two shank anus 112*a* and 112*b* in such a way as to allow the arms to be adjusted to varying angles 119 relative to one another. To accomplish this function, the joint 116 may be formed in a variety of ways. As illustrated (see FIGS. 5*a*, 6*a*-6*b*, the joint 116 may be a simple bolt mechanism having holes formed at the joint end of each arm (e.g., a through-hole 117*a* in arm 112*a* and a threaded-hole 117*b* in arm 112*b*) that are sized in diameter to receive a bolt 117*c*. Alternatively, 117*c* might consist of a rivet, pin or similar connector. For example, in FIG. 6*b* it is shown as a ½-20, 0.5 inch (1.27 cm) long threaded knob.

Referring to FIGS. 5*a*, 5*b*, 5*d*, 5*f* and 5*h*, various views of arms 112*a*/112*b* are shown showing holes 117*a*/117*b* located at the joint, end of each arm. Though this version of the device consists of a through-hole 117*a* in arm 112*a* and a threaded-hole 117*b* in arm 112*b*, the reader will understand that other configurations are possible. Once the bolt 117*c* is inserted through through-hole 117*a* to threaded-hole 117*b*, the arms 112*a*/112*b* are held together and adjustable in angle 119 one to the other by adjustment of the joint 116. Alternatively, a tension spring mechanism might be employed at the center of joint 116 to hold the arms 112*a*/112*b* together and enable their adjustment in angle 119 one to the other. The joint 116 will generally lock into position to hold the angle 119 steady while attached to the tail fan 900.

The joint 116 can be set and locked to adjust the two arm members 112*a* and 112*b* to form an angle 119 about the joint, that optimally displays the tail fan 900 of a particular bird (see, e.g., FIG. 5*a*, 6*a*-6*b*, 7). Typically, turkey tail fans 900 are spread to an angle of 180 degrees. A live turkey can spread its tail fan to an angle of 210 to 230 degrees. Both versions of the present invention function to spread the turkey tail fans 900 to an appropriate angle 119. This second jointed version of the display device 100, however, enables the user to set the angle 119 to variable degrees according to the user's preference, thus adjusting the tail fan spread to the user's liking. It also provides the advantage of small size since the device 100 may be folded (e.g., to a folded length of about 3.25 inches (8.25 cm) in the present embodiment to easily fit in the palm of a user's hand) making it easily transported in a user's pocket, conveniently available when needed. Because of the ability to adjust the angle of display and small size when folded, this version is ideal for the purpose of photography of recently harvested turkeys in the field.

Note that in all versions of the display device 100, a scale may optionally be provided on one or more sides of the shank 112 for taking field measurements of parts of the turkey, such as the beard 920 and spurs, etc. (see FIGS. 2*c*, 3*c*). The length of the illustrated versions of the device's shank 112 is typically about 6.0 inches (8.54 cm), allowing for a 6 inch scale. The display device 100 may further consist of mechanisms 120 for hanging the display on walls or the like. For example, in FIGS. 2*a*-2*c* and 3*a*-3*c*, a hanging mechanism 120 is shown that consists of a centered hole and slot sized for insertion over the head of a nail or screw in a wall.

Closing

Although the present invention has been described in considerable detail with reference to certain preferred versions thereof, other versions are possible. Therefore, the spirit and scope of the appended claims should not be limited to the description of the preferred versions contained herein.

What is claimed is:

1. A method for spreading a turkey's tail feathers in a fan-shaped display about a central hub from which said tail feathers extend, each of said tail feathers having a central quill attaching a base of the feather to said hub, the method comprising the steps of:

a) providing a display device, comprising:

i) an elongated shank having two opposing ends defining a length therebteween; and, ii) two quill clips located one at each of the two opposing ends of said shank, said two quill clips each having one or more grooves sized and shaped to snap securely onto the central quills near the base of one or more of the turkey's outer tail feathers located to either opposite side of the hub; and, b) snapping each of said two quill clips onto the quills near the base of one or more of the turkey's outer tail feathers located to either opposite side of the hub, thereby holding the clipped outer tail feathers apart and spreading the turkey's tail feathers located intermediate the clipped outer tail feathers in the fan-shaped display about the hub.

2. The method of claim 1, wherein the shank of the display device further comprises an adjustable joint located midway between the two opposing ends and dividing the shank into two arm members, each of the two arm members extending out from the joint to one of said two opposing ends at an angle relative to one another about the joint, said angle being defined by adjustment of the joint; and further comprising the step of adjusting the angle of the joint to optimally display the tail feathers.

3. The method of claim 1 further comprising measuring a length of a portion of the turkey using measurement indicia on the elongated shank.

4. The method of claim 1 further comprising hanging the elongated shank from a wall to display the fan-shaped display.

5. A method for spreading a bird's tail feathers in a fan-shaped display about a central hub from which the tail feathers extend, each of the tail feathers having a central quill attaching a base of the feather to the central hub, the method comprising:

securing one end of an elongated device onto the center quill of at least one of the bird's outer tail feathers protruding from one side of the central hub;

securing another end of the elongated device onto another center quill of at least one other of the bird's outer tail feathers protruding from an opposite side of the central hub; and, spreading the bird's tail feathers located intermediate the secured, outer tail feathers in the fan-shaped display about the hub.

6. The method of claim 5 further comprising hanging the fan-shaped display on a wall.

7. The method of claim 6 wherein said hanging comprises attaching the elongated device to the wall.

8. The method of claim 5 wherein the elongated device includes an elongated shank that has a lockable pivot joint therein defining the elongated shank into a first arm securable to the center quill of at least one of the bird's outer tail feathers protruding from one side of the central hub and into a second arm securable onto the another center quill of at least one other of the bird's outer tail feathers protruding from an opposite side of the central hub and wherein said method further comprises:

adjusting an angle between the first and second arms; and locking the pivot joint to prevent movement of the first and second arms relative to each other.

9. The method of claim 5 wherein said securing the one end of an elongated device onto the center quill of at least one of the bird's outer tail feathers protruding from one side of the central hub comprises snapping the center quill of one of the bird's outer tail feathers protruding from the one side of the central hub into a first portion of the elongated device and wherein said securing the another end of the elongated device onto another center quill of at least one other of the bird's outer tail feathers protruding from an opposite side of the central hub comprises snapping the another center quill of one of the other bird's outer tail feathers into a second portion of the elongated device.

10. The method of claim 9 wherein the center quills of the bird's tail feathers are compressible and wherein the first and second portions of the elongated device are each configured to snappingly engage the central quill portions of corresponding tail feathers.

11. The method of claim 5 further comprising:

securing the one end of the elongated device onto the center quill of a second one of the bird's outer tail feathers protruding from one side of the central hub; and securing the another end of the elongated device onto the center quill of a second one of the other outer tail feathers protruding from an opposite side of the central hub.

12. The method of claim 5 wherein the elongated device is secured to the center quill of at least one of the bird's outer tail feathers protruding from one side of the central hub and onto another center quill of at least one other of the bird's outer tail feathers protruding from an opposite side of the central hub such that the elongated device cannot be viewed from a front side of the fan-shaped display.

13. A method for spreading a turkey's tail feathers in a fan-shaped display about a central hub from which the tail feathers extend, each of the tail feathers having a central quill attaching a base of the feather to the central hub, the method comprising:

securing one end of an elongated device onto the center quill of at least one of the turkey's outer tail feathers protruding from one side of the central hub;

securing another end of the elongated device onto another center quill of at least one other of the turkey's outer tail feathers protruding from an opposite side of the central hub; and spreading the turkey's tail feathers located intermediate the secured outer tail feathers in the fan-shaped display about the hub.

14. The method of claim 13 further comprising using a portion of the elongated device to measure the turkey's beard.

15. The method of claim 13 further comprising using a portion of the elongated device to measure the turkey's spurs.

16. The method of claim 13 further comprising the step of photographing the turkey while the elongated device maintains the fan-shaped display.

* * * * *

UNITED STATES PATENT AND TRADEMARK OFFICE

CERTIFICATE OF CORRECTION

PATENT NO. : 8,323,756 B2
APPLICATION NO. : 13/432025
DATED : December 4, 2012
INVENTOR(S) : Darrell E. Peterson It is certified that error appears in the above-identified patent and that said Letters Patent is hereby corrected as shown below:

In the Specification

Column 2, line 4, “in”, should read --In--; line 21, “in”, should read --In--; line 43, “hilly”, should read --being--.

Column 3, line 19, “dip”, should read --clip--; line 58, “heard”, should read --beard--; line 63, “huh”, should read --hub--.

Column 4, line 11, “hack”, should read --back--; line 42, “haying”, should read --having--.

Column 5, line 12, “anus”, should read --arms--.

Column 6, line 1, “anus”, should read --arms--.

Signed and Sealed this
Fourth Day of June, 2013

Teresa Stanek Rea
*Acting Director of the United States Patent and Trademark Office*